United States Patent [19]

Beares

[11] 4,319,860

[45] Mar. 16, 1982

[54] PLUNGE TYPE ROUTER

[75] Inventor: Allen G. Beares, Towson, Md.

[73] Assignee: Black & Decker Inc., Newark, Del.

[21] Appl. No.: 125,957

[22] Filed: Feb. 29, 1980

[51] Int. Cl.[3] .......................... B23C 1/20; B27C 5/10

[52] U.S. Cl. .............................. 409/182; 144/134 D; 144/136 C; 408/14

[58] Field of Search .............................. 409/182, 184; 144/134 D, 136 C, 144.5; 408/14, 112

[56] References Cited

U.S. PATENT DOCUMENTS

| | | | |
|---|---|---|---|
| 1,584,078 | 5/1926 | Carter | 409/182 |
| 1,899,883 | 2/1933 | Sacrey | 144/136 C |
| 2,741,284 | 4/1956 | Johnson | 144/144.5 |
| 2,855,963 | 10/1958 | Potter | 144/134 D |
| 3,791,260 | 2/1974 | Ambler et al. | 409/182 |

*Primary Examiner*—Z. R. Bilinsky

*Attorney, Agent, or Firm*—Harold Weinstein; Edward D. Murphy; Walter Ottesen

[57] ABSTRACT

A plunge type router is disclosed which includes an improved depth lock system operative to exert a clamping force directly on the motor housing and which distributes the clamping force over a substantial surface area thereof whereby the motor housing may be securely retained in position without damaging or distorting the housing. An adjustable depth stop system is also provided which provides a positive, easily, accurately adjustable stop member engageable by a portion of the motor housing and an associated rack and pinion adjustment assembly operative to accurately locate the stop member so as to provide positive control of the depth of cut.

8 Claims, 8 Drawing Figures

FIG. 8.
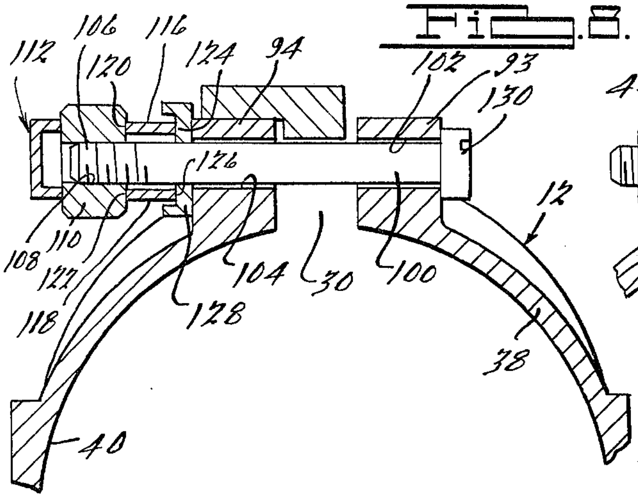
FIG. 5.
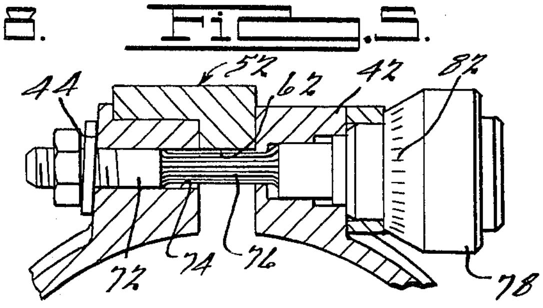
FIG. 6.
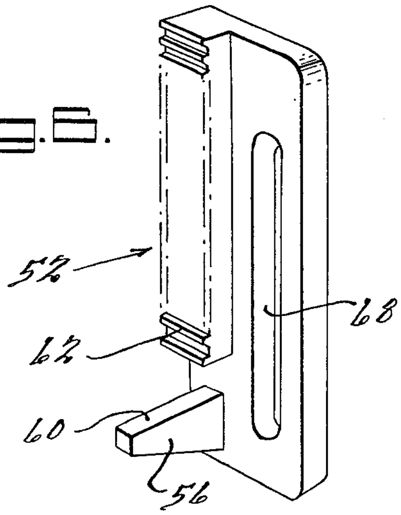
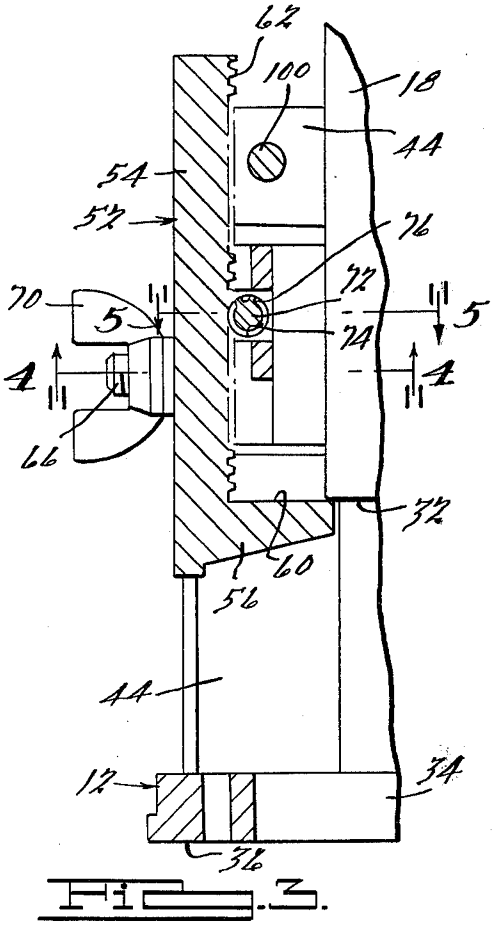
FIG. 3.
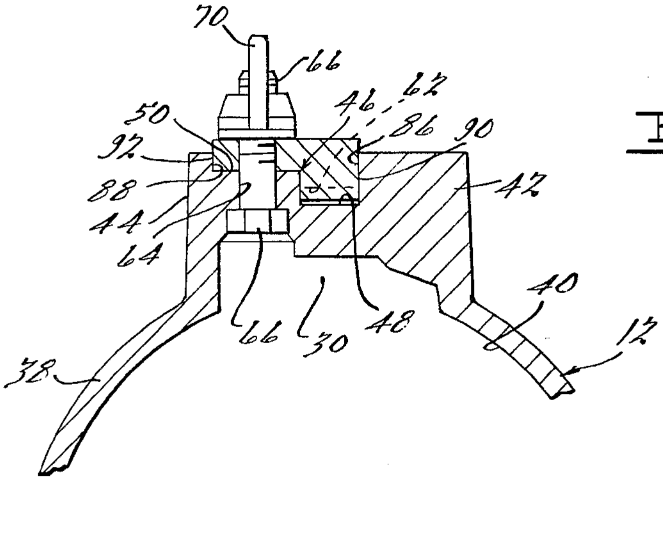
FIG. 4.

PLUNGE TYPE ROUTER

BACKGROUND AND SUMMARY OF THE INVENTION

The present invention relates generally to router constructions and more particularly to plunge type router constructions which include an adjustable cutting depth stop system and a depth locking system.

Plunge type routers are similar to conventional routers in that they include a driving motor having a bit or cutting tool holding chuck secured to one end of the motor drive shaft which motor is axially movably supported with a base housing. However, while in conventional non-plunge type routers, the motor is locked in position relative to the base housing such that the cutting tool or bit projects axially outwardly from the workpiece engaging surface of the base housing to the desired depth of cut at all times, the plunge type routers provide biasing means which operate to retract the cutting tool or bit into the base housing during periods of non-use. In order to enable the router to be "plunged" to the desired cutting depth, such plunge type routers are also commonly provided with adjustable depth stop systems and may also include means for locking the motor housing at preselected position such as the cutting depth.

In one common construction for plunge type routers the motor housing is movably positioned and supported on a pair of guide bars extending generally perpendicularly upwardly from a work engaging flange member. An adjustable depth stop system includes a relatively smooth third bar or rod member adjustably secured to the motor housing such that the lower end thereof will engage a portion of the work engaging flange portion. In some designs, a turret may be provided on the flange member, the turret having a plurality of surfaces the height of which may be adjusted so that the depth of cut may be changed from a first preselected value to another preselected value by rotation of the turret so as to bring a different height surface into position for engagement by the preset bar or rod. However, while this type of system offers the advantage of being able to initially "program" the router for a plurality of depths of cut, it is difficult to exert a sufficient clamp force on the smooth bar or rod to prevent slight movement thereof during extended use. Of course, any movement of the guide bar relative to the motor housing will result in an error in each of the cutting depths for which the turret surfaces have been set. Also, in some of these designs, no measuring device is provided by which to gauge the setting of the guide bar or turret surfaces. Further, on those providing some form of scale, it is common to fixedly attach the scale to the motor housing. Thus, when a new cutting tool is fitted to the router, it is necessary to perform a calibration step in order to obtain the scale reading for a zero depth of cut and then mathematically compute the actual scale setting corresponding to the desired depth of cut.

It is also common to provide a depth lock system on plunge type routers which may be actuated to lock the motor housing in a desired position relative to the flange member such as the desired cutting depth thereby enabling the operator to concentrate on insuring proper tracking of the router without concern as to maintaining sufficient downward pressure on the motor housing to maintain the desired depth of cut. However, in the designs described above, the depth lock system comprises clamping means which typically engage only one of the two support and guide bars. This unbalanced locking system leaves the motor secured at only one point and may result in undesirable movement thereof during a cutting operation particularly when the direction of movement of the router is changed. Also, the likelihood of movement resulting may increase substantially over time as the relative small diameter guides do not afford a substantial wear surface for the repeated reciprocable movement of the motor housing.

The present invention, however, provides a plunge type router which substantially reduces the aforementioned problems associated with present designs. The router of the present invention provides an easily and conveniently readily adjustable depth stop system which may be easily calibrated to a zero setting on a scale associated with the adjustment means thus enabling any desired cutting depth to be merely "dialed" in. Further, the depth stop system utilizes a positive acting rack and pinion drive system for moving the stop means which allows smooth fine tuning of the desired cutting depth. Further, a clamping arrangement associated with the depth stop system enables a substantial clamping force to be exerted on the stop member so as to retain it in position during repeated operations and also the easily read scale associated with the pinion drive provides a quick means to verify the cutting depth.

The router of the present invention also includes a positive acting depth lock system which exerts a clamping force directly on the motor housing which clamping force is distributed over substantial circumferential surface of the motor housing thereby preventing any unbalancing from occuring which may result in unwanted movement of the cutting tool carrying motor housing. Additionally, because the router of the present invention utilizes the engagement between the circumference of the motor housing and a bore provided in an annular upstanding portion of a base to guide the vertical movement of the motor housing during operation and the clamping mechanism acts over substantially this entire relatively large surface area, it is substantially more resistant to wear which may result in unsatisfactory performance.

Additional advantages and features of the present invention will become apparent from the subsequent description and the appended claims taken in conjunction with the accompanying drawings.

BRIEF DESCRIPTION OF THE DRAWINGS

FIG. 3 is an enlarged fragmentary sectioned view of the depth stop system in accordance with the present invention, the section being taken along line 3—3 of FIG. 1;

FIG. 4 is also an enlarged fragmentary sectioned view of the depth stop in accordance with the present invention shown with the motor housing removed therefrom, the section being taken along line 4—4 of FIG. 3;

FIG. 5 is a section view of the rack and pinion drive arrangement for positioning the stop member, the section being taken along line 5—5 of FIG. 3;

FIG. 6 is a perspective view of the stop member forming a part of the depth stop system in accordance with the present invention;

FIG. 8 is also an enlarged fragmentary view of the depth lock system shown in section with the motor housing removed therefrom, the section being taken along line 8—8 of FIG. 1.

DESCRIPTION OF THE PREFERRED EMBODIMENT

Figure 1:
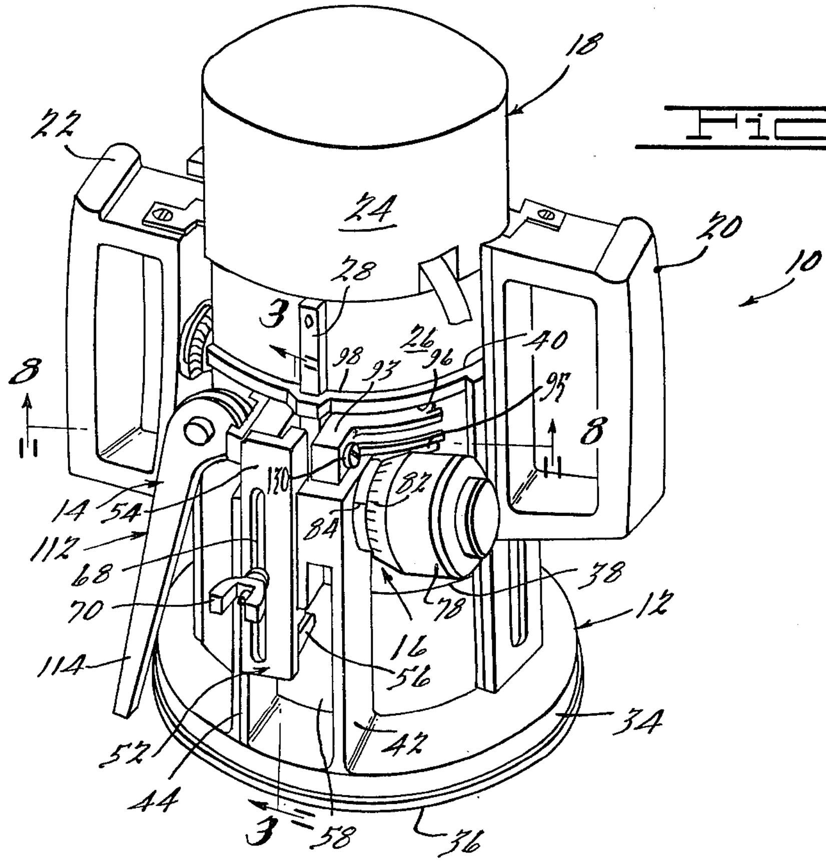
FIG. 1 is a perspective view of a plunge type router in accordance with the present invention.
Figure 7:
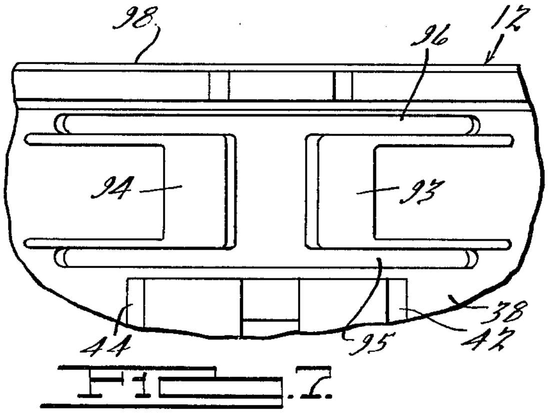
FIG. 7 is a fragmentary front elevational view of a portion of the base housing shown in FIG. 1 showing a portion of the depth lock system and having portions thereof broken away.
Figure 2:
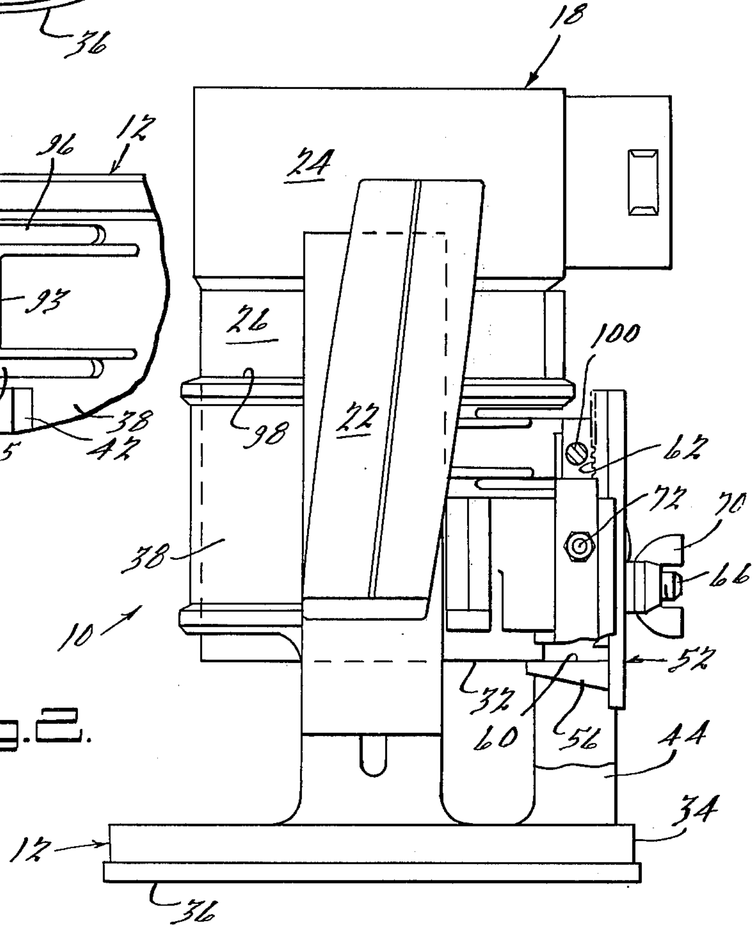
FIG. 2 is a side elevational view of the router of FIG. 1 having portions thereof broken away to illustrate a portion of the depth stop system.

Referring now to the drawings and in particular to FIG. 1, there is shown a plunge type router in accordance with the present invention indicated generally at 10. Router 10 includes a base housing 12 having a depth locking system 14 provided thereon and a depth stop system 16 also provided thereon, a motor housing 18 movably supported on base housing 12 and a pair of handles 20 and 22 secured to opposite sides of motor housing 18 and movable therewith.

Motor housing 18 is generally cylindrical in shape and includes an enlarged diameter upper portion 24 and a relatively smooth constant diameter low portion 26. A suitable elongated axially extending guide bar 28 is secured to the outer surface of lower portion 26 which is movably received within a suitable notch 30 provided in base housing 12 and operates to prevent relative rotation therebetween. While not shown, a suitable driving motor is housed within motor housing 18 and will include a rotatable drive shaft extending axially outwardly from the lower surface 32 thereof to which a suitable chuck may be secured.

Router 10 will also be provided with suitable biasing means (not shown) operative to urge motor housing 18 axially upwardly relative to base housing 12 and into a retracted position. While any suitable biasing means may be utilized, a particularly well suited and preferred biasing arrangement is disclosed and forms the subject matter of a copending application entitled "Plunge Type Router Construction", Ser. No. 125,958 filed Feb. 29, 1980, and assigned to the same assignee as the present invention, the disclosure of which is hereby incorporated by reference.

Base housing 12 comprises a lower generally circularly shaped flange portion 34 having substantially planar work engaging lower surface 36 provided thereon and a generally cylindrically shaped upwardly extending main body portion 38. A relatively large diameter bore 40 extends axially through main body portion 38 and is adapted to movably support and guide motor housing 18 for reciprocable movement with respect thereto. A pair of spaced substantially parallel radially outwardly extending axially elongated flange portions 42 and 44 are provided on main body portion 38 of base housing 12 extending along substantial portion of the axial length thereof and which define an axially generally L-shaped slot 46 therebetween which includes radially offset surfaces 48 and 50.

A stop member 52 of a generally L-shape is also provided being movably received within slot 46 and which includes a generally axially extending elongated portion 54 of a width substantially equal to the distance between axially extending flange portions 42 and 44. A stop flange 56 is integrally formed with elongated portion 54 and projects radially inwardly through an opening 58 provided in the lower sidewall of the main body portion 38 of base housing 12. Stop flange 56 has an upper surface 60 which is positioned so as to engage bottom edge portion 32 of motor housing 18 so as to thereby limit downward movement of motor housing 18 relative to base housing 12 when stop member 52 is secured in position. Stop member 52 also includes a plurality of rack teeth 62 extending axially along the radially inwardly facing surface portion thereof which, as shown, are also integrally formed thereon. However, it should be noted that if desired rack teeth may be in the form of a separately fabricated bar suitably secured to the stop member.

In order to movably secure stop member 52 to main body portion 38, a radially outwardly extending opening 64 is provided in main body portion 38 positioned closely adjacent flange portion 44 and within which a bolt 66 is fitted which extends radially outwardly beyond the outer edges of flange portion 44. A slot 68 is provided in elongated portion 54 through which bolt 66 extends and a wing nut 70 or other suitable fastening means threadedly engages the outer end thereof so as to retain stop member 52 in position within slot 46.

Adjustment means are also provided for accurately and smoothly positioning stop member 52 in a desired location relative to base housing 12. The adjustment means comprises an elongated shaft 72 rotatably positioned within an opening 74 extending through both flange portion 42 and 44. Shaft 72 has a plurality of pinion gear teeth 76 provided thereon intermediate the ends thereof which are positioned so as to be in meshing engagement with rack teeth 62 provided on stop member 52. A suitable knob 78 designed to be easily grasped by an operator is secured to one end of shaft 72 and is operative to rotate same. The other end of the shaft may be provided with any suitable means operative to retain it in position within the opening 74 such as for example a suitable locking threaded nut 80.

In order to provide a visual readout of the depth of cut for which stop member 52 is set, a portion of knob 78 is provided with suitable micrometer type scale markings 82 and an indicator mark 84 is scribed on an adjacent section of main body portion 38. Preferably, micrometer scale markings 82 will be provided on a portion of the knob which may be separately rotated although is associated therewith in such a manner as to offer relatively high resistance to movement relative to the main portion of knob 78. Thus, while scale markings 82 may be separately rotated with respect to both shaft 72 and the main portion of knob 78 when they are restrained, the scale will rotate freely along with the knob once when it is otherwise not restrained.

In order to calibrate the micrometer scale, the operator need merely place the router on any flat surface, lower stop member 52 to its lowest position then move motor housing 18 axially downward until the cutting tool or bit contacts the flat surface. Next knob 78 is rotated moving stop member 52 axially upwardly until the stop surface 60 engages the lower edge 32 of the motor housing 18. Then the micrometer scale 82 may be rotated relative to the main portion of the knob so as to bring the zero marking into alignment with indicator mark 84 on the base housing. Use of similar micrometer scales and calibration features are known in the art, the same having been utilized in conjunction with non-plunge type routers.

Once micrometer scale 82 has been calibrated for the particular cutting tool to be used, the depth of cut desired may be easily set by first releasing wing nut 70 so as to allow relative axial movement of stop member 52. Knob 78 may then be rotated moving scale 82 to the desired reading which will cause shaft 72 ro rotate thereby moving stop member 52 downwardly through the action of the meshing rack and pinion teeth 62 and 76 respectively. Opposed surfaces 86 and 88 of the flange portions 82 and 44 are positioned so as to operate to cooperate with the axially extending edge surfaces 90 and 92 of stop member 52 to constrain lateral shifting and/or rotational movement of stop member 52 thereby insuring accurate axial positioning thereof. Once stop member 52 has been thus positioned, wing nut 70 is securely tightened so as to clamp stop member in position between the inner surface of wing nut 70 and surface 50 of slot 46. Once positioned, stop surface 60 will act to positively limit the axially downward movement of the motor housing 18 and associated cutting tool through engagement with the lower surface 32 of the motor housing 18.

The router of the present invention also includes a depth lock system 14. As best seen in FIG. 1, main body portion 38 of base housing 12 has a pair of circumferentially spaced generally radially outwardly projecting flange portions 93 and 94 positioned above respective flange portions 42 and 44 and separated therefrom by a circumferentially extending slot 95. A second slot 96 is positioned in substantially parallel axial spaced relationship to slot 95 above flanges 93 and 94 and immediately adjacent the upper edge 98 of base portion 38. Slots 95 and 96 extend circumferentially a substantially equal distance in both directions from each of flange portions 93 and 94. In one embodiment, slots 95 and 96 extend circumferentially through an arc of approximately 90° with flange portions 93 and 94 being generally centrally disposed therealong. A bolt 100 is provided extending through aligned openings 102 and 104 provided in each of flange portions 93 and 94 respectively and has a threaded end portion 106 projecting outwardly from flange portion 93. End portion 106 of bolt 100 is threadedly received within a diametrically extending opening 108 positioned approximately midway between opposite ends of a generally cylindrically shaped pivot pin 110.

An actuating lever 112 is also provided which includes an elongated handle portion 114 and a pair of substantially parallel spaced substantially identical arcuately shaped arms 116 and 118 positioned at one end thereof. As best seen with reference to FIG. 8, arms 116 and 118 are spaced apart a distance only slightly greater than the diameter of bolt 100 and include aligned openings 120 and 122 within which pivot pin 110 is fitted. The arcuately shaped edges 124 and 126 of arms 116 and 118 operate to provide a cam surface. A cam follower member 128 is provided being movably positioned on the bolt and having one surface engageable with flange portion 94 and an opposite surface engageable with the arcuately shaped edges 124 and 126 provided on respective arms 116 and 118. As shown, openings 120 and 122 in arms 116 and 118 are positioned with respect to edges 124 and 126 thereof so as to effect an eccentric movement thereof during rotation of actuating arm 112.

In order to operate depth lock system 14 of the present invention, the operator will move actuating lever 112 downwardly in a counterclockwise direction as shown in FIG. 1 which, because of the eccentric movement, will reduce the distance between the edge surfaces 124 and 126 of the arms 116 and 118 and the headed end 130 of the bolt thereby operating to generate a force tending to draw flange portions 93 and 94 toward each other. Because flange portions 93 and 94 are separated from the rest of main body portion 38 by the slots 95 and 96, they will be drawn toward each other in response to this force. This converging movement of flange portions 93 and 94 will result in a radially inwardly directly deflection of these portions of the main body portion 38 lying between slots 95 and 96 thereby causing them to clampingly engage the generally cylindrically shaped lower portion 26 of motor housing 18. Because slots 95 and 96 extend over a considerable circumferential distance and also because a reaction force will also be exerted on the motor housing by the inner surface of the main body portion 38 positioned diametrically opposite therefrom, the clamping forces will be distributed over a substantial surface area of motor housing 18. This allows the use of greater clamping force without the possibility of damaging motor housing 18 and further insures that depth lock system 14 will securely and positively lock motor housing 18 in any desired position.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

I claim:

1. In a plunge type router including a motor housing having a driving motor provided therein including a driving shaft extending outwardly from the lower end thereof, said driving shaft being adapted to have a cutting tool secured thereto, a base housing having a work engaging flange portion and a main body portion extending upwardly therefrom, said main body portion having a bore extending therethrough, said motor housing being supported within said bore and axially movable with respect to said base housing between a retracted position in which said cutting tool is positioned above said work engaging flange portion and an outwardly extended position in which said cutting tool projects below said work engaging flange portion a predetermined distance, improved means for selecting said predetermined distance and locking said driving motor in said extended position comprising:

first and second locking flange means projecting generally radially outwardly from said main body portion, said flange portions being positioned in circumferentially spaced relationship and in part defining an opening therebetween in a sidewall of said main body portion; and means for exerting a pulling force on each of said first and second flange means to thereby move said first and second flange means toward each other, said movement being operative to restrict the diameter of said bore whereby a clamping force is exerted on said motor housing so as to lock said motor housing in said extended position;

a stop member including an axially elongated flange portion movably positioned on the outer surface of said main body portion and a stop flange portion extending radially inwardly from said elongated flange portion, said stop flange portion being engageable with a lower end of said motor housing so as to prevent outward movement of said cutting tool beyond said predetermined distance.

rack means provided on a radially inwardly facing surface of said elongated flange portion; a pair of spaced substantially parallel outwardly extending axially elongated guide flange portions provided on said main body portion, said elongated flange portion being positioned between said guide flange and said guide flange having opposed surfaces operative to guide axial movement of said stop means, a rotatable shaft extending through aligned openings provided in each of said guide flange portions;

gear means provided on said rotatable shaft, said gear means being in meshing engagement with said rack whereby said rotatable shaft is operative to axially move said stop means; and clamp means operative to clamp said stop means to said main body portion in a preselected position whereby said stop flange will operate to prevent outward movement of said cutting tool beyond said predetermined distance.

2. A plunge type router as set forth in claim 1 wherein said main body portion further includes a pair of axially spaced circumferentially extending slots positioned immediately adjacent either axial side of said first and second flange means and extending through said opening, said slots being operative to facilitate relative movement to said first and second flange means.

3. In a plunge type router including a motor housing having a driving motor provided therein, a base housing having a work engaging flange portion and a main body portion extending upwardly therefrom, said main body portion being provided with a bore extending therethrough, said motor housing being supported within said bore and axially movable with respect to said base housing between a retracted position and a preselected extended position, improved means for preselecting said extended position comprising:

stop means axially movably secured to said main body portion of said base housing, said stop means including a flange portion extending radially inwardly into said base engageable with a lower peripheral edge portion of said motor housing so as to limit axial movement of said motor housing to said preselected position when said stop means is positioned in said predetermined position;

said stop means further including an axially elongated flange portion having an elongated slot provided therein and positioned on a radially outer surface of said main body portion;

guide means for guiding axial movement of said stop means, said guide means including a pair of axially elongated radially outwardly substantially parallel guide flange portions formed on said main body portion, opposite surfaces of said guide flange portions being operative to guide axial movement of said stop means;

drive means operative to move said stop means into a predetermined position, said drive means including a rotatable shaft extending through aligned openings provided in said guide flange portions and gear means provided on said shaft;

said elongated flange portion of said stop means further including a rack positioned in meshing engagement with said gear means whereby said rotatable member is operative to move said stop means; and clamp means operative to clamp said stop means in said predetermined position, said clamp means including a member extending through said slot in said elongated flange portion of said stop means and engageable with an outer surface of said flange portion.

4. In a plunge type router including a motor housing having a driving motor provided therein including a driving shaft extending outwardly from the lower end thereof, said driving shaft being adapted to have cutting tool secured thereto, a base housing having a work engaging flange portion and a main body portion extending upwardly therefrom, said main body portion having a bore extending therethrough, said motor housing being supported within said bore and axially movable with respect to said base housing between a retracted position in which said cutting tool is positioned above said work engaging flange portion and an outwardly extended position in which said cutting tool projects below said work engaging flange portion a predetermined distance, improved means for selecting said predetermined distance comprising:

a stop member including an axially elongated flange portion having an elongated slot provided therein and movably positioned on the outer surface of said main body portion and a stop flange portion extending radially inwardly from said elongated flange portion, said stop flange portion being engageable with said lower end of said motor housing so as to prevent outward movement of said cutting tool beyond said predetermined distance;

rack means provided on a radially inwardly facing surface of said elongated flange portion;

a pair of spaced substantially parallel outwardly extending axially elongated guide flange portions provided on said main body portion, said elongated flange portion being positioned between said guide flanges and said guide flange having opposed surfaces operative to guide axial movement of said stop means;

a rotatable shaft extending through aligned openings provided in each of said guide flange portions;

gear means provided on said rotatable shaft, said gear means being in meshing engagement with said rack whereby said rotatable shaft is operative to axially move said stop member; and clamp means operative to clamp said stop means to said main body portion in a preselected position whereby said stop flange will operate to prevent outward movement of said cutting tool beyond said predetermined distance, said clamp means including a threaded member extending outwardly from said main body portion and through said slot in said stop member elongated flange portion and through said slot in said stop member elongated flange portion, and fastening means threaded on said threaded member, said fastening means being operative to clamp said elongated flange portion against said main body portion whereby said stop member may be secured in said preselected position.

5. In a plunge type router including a motor housing having a driving motor provided therein including a driving shaft extending outwardly from the lower end thereof, said driving shaft being adapted to have a cutting tool secured thereto, a base housing having a work engaging flange portion and a main body portion extending upwardly therefrom, said main body portion having a bore extending therethrough, said motor housing being supported within said bore and axially movable with respect to said base housing between a retracted position in which said cutting tool is positioned above said work engaging flange portion and an outwardly extended position in which said cutting tool projects below said work engaging flange portion a predetermined distance, improved means for selecting said predetermined distance and locking said driving motor in said extended position comprising:

first and second locking flange portions projecting generally radially outwardly from said main body portion, said locking flange portions being positioned in circumferentially spaced relationship and in part defining an opening in a sidewall of said main body portion;

a pair of circumferentially extending slots provided in said sidewall of said main body portion, said slots being positioned in substantially parallel axial spaced relationship and extending through said opening;

a pair of aligned openings extending through each of said first and second flange portions;

an elongated member having a head on one end thereof extending through said openings;

actuating means connected to the other end of said elongated member and operative in response to actuation thereof to exert a pully force between said elongated member and one of said first and second flange portions, said head being operative to exert a pulling force on the other of said first and second flange portions;

said pulling forces acting on oppositely facing surfaces of said first and second flange portions to effect a deflection thereof in a converging direction whereby the diameter of said bore is restricted in the area between said slots so as to exert a circumferential clamping force on said motor housing whereby said motor housing may be locked in said outwardly extended position;

stop means axially movably secured to said main body portion of said base housing;

guide means for guiding axial movement of said step means;

drive means operative to move said stop means into a preselected position, said stop means including a portion engageable with said motor housing so as to limit axial movement of said motor housing whereby outward movement of said cutting tool is limited to said predetermined distance when said stop means is positioned in said predetermined position;

said portion of said stop means including a flange portion extending radially inwardly into said bore and engageable with a lower peripheral edge portion and said motor housing; and clamp means operative to clamp said stop means in said predetermined position.

6. A plunge type router as set forth in claim 5 wherein said drive means includes a rotatable member provided on said base housing, said rotatable member being operative to move said stop means.

7. In a plunge type router including a motor housing having a driving motor provided therein, a base housing having a work engaging flange portion and a main body portion extending upwardly therefrom, said main body portion having a bore extending therethrough, said motor housing being supported within said bore and axially movable with respect to said base housing between an extended and retracted position, improved depth stop means and depth lock means for setting said preselected extended position and locking said motor housing in said preselected extended position, said improved means comprising:

stop means axially movably secured to said main body housing;

means for positioning said stop means relative to said motor housing whereby said stop means will operate to prevent axial movement of said motor housing beyond said preselected extended position;

said stop means including an elongated member having a rack provided thereon and said positioning means including a rotatable shaft secured to said main body portion having gear means provided thereon, said gear means being positioned in meshing engagement with said rack whereby rotation of said shaft is operative to axially position said stop means relative to said main body portion; and locking means provided on said main body housing for locking said motor housing in said preselected extended position, said locking means being operative to releasably exert a circumferential clamping force on a portion of said motor housing positioned within said bore whereby relative movement between said base housing and said motor housing is restricted.

8. A plunge type router as set forth in claim 7 wherein said portion of said stop means comprises a flange portion extending radially into said bore and engageable with a lower peripheral edge portion of said motor housing.

* * * * *